(12) United States Patent
Gopalakrishnan et al.

(10) Patent No.: US 12,537,781 B2
(45) Date of Patent: Jan. 27, 2026

(54) PERSONALIZING USER EXPERIENCE ACROSS CHANNELS

(71) Applicant: FMR LLC, Boston, MA (US)

(72) Inventors: Ashwin Veeravalli Gopalakrishnan, Tamilnadu (IN); Boris Vulikh, Swampscott, MA (US); Mohammedi Padaria, Holly Springs, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/756,217

(22) Filed: Jun. 27, 2024

(65) Prior Publication Data

US 2025/0030653 A1    Jan. 23, 2025

Related U.S. Application Data

(60) Provisional application No. 63/510,482, filed on Jun. 27, 2023.

(51) Int. Cl.
*H04L 51/046* (2022.01)
*G06Q 30/0201* (2023.01)

(52) U.S. Cl.
CPC ....... *H04L 51/046* (2013.01); *G06Q 30/0201* (2013.01)

(58) Field of Classification Search
CPC .............. H04L 51/046; G06Q 30/0201; G06Q 30/016
See application file for complete search history.

(56) References Cited

U.S. PATENT DOCUMENTS

| 2015/0030151 A1* | 1/2015 | Bellini | G06Q 10/063 379/265.06 |
| 2015/0317651 A1* | 11/2015 | Barker | G06Q 30/0204 705/7.33 |
| 2019/0372940 A1* | 12/2019 | Mcdougall | G06F 21/6254 |

* cited by examiner

*Primary Examiner* — Benjamin M Thieu
(74) *Attorney, Agent, or Firm* — Cesari and McKenna, LLP

(57) ABSTRACT

Methods and apparatuses are described for providing a centralized treatment selector for providing personalized cross-channel treatments for a given user. A computing device of a system establishes a first communication session with a user in a first channel. The system receives, at a treatment selector application, a user identifier and an experience context from the first channel. The system retrieves, from a treatment map store, one or more treatment maps compatible with the experience context, wherein the one or more treatment maps comprise an eligibility rule. The system obtains customer attributes for the user from an attribute store using the user identifier. One or more treatment maps and the customer attributes are provided to an eligibility rule engine that in turn identifies a set of eligible treatment maps based on the customer attributes and the eligibility rules for each of the one or more treatment maps. Identifiers for one or more of the set of eligible treatment maps are returned to the first channel. The first channel retrieves and applies, using the identifiers, a treatment map selected from the set of eligible treatment maps using a treatment catalog.

20 Claims, 9 Drawing Sheets

| Channel | Content Name | Status | Content Type | Description | Created By |
|---|---|---|---|---|---|
| WEB | WEB-PENNY-STOCK-TRADING-NEXT STEPS<br>1000637 Rules Driven | Live | Action | | |
| VA | VA-PLANNING-GUIDANCE-CENTER-PROACTIVE<br>1001003 Rules Driven | Live | Action | | |
| WEB | WEB-LIFE-EVENTS-HUB<br>1001066 Rules Driven | Live | Teaser | | |
| MOBILE | MOBILE-PROFILE-NBA-PANEL<br>1001201 Rules Driven | Live | Action | | |
| WEB | WEB-PLAN-SUM-ON-YOUR-MIND<br>1000402 Rules Driven | Live | Action | | |
| MOBILE | MOBILE-TRADE-TICKET<br>1000670 Rules Driven | Live | Action | | |
| MOBILE | MOBILE-ALL-ACCT-NBA-PANEL<br>1001200 Rules Driven | Live | Action | | |

FIG. 8

Headline: There may be a way to increase your Social Security benefits
Status:
TCM ID: tcm:526-703919
Path: /060 www.fidelity.com/Building Blocks/Content/Library/Foundational Content Store/Call to Action/PGC-WaitForSSNBA Impressions: ##
Clickthrough rate: ##
eReview:
Has interstitial: NO
Mobile only: NO

FIG. 9

PERSONALIZING USER EXPERIENCE ACROSS CHANNELS

CROSS-REFERENCE TO RELATED APPLICATIONS

This Application claims the benefit of and priority to U.S. Provisional Application Ser. No. 63/510,482, filed Jun. 27, 2023, the content of which is incorporated herein by reference in its entirety.

TECHNICAL FIELD

This application relates generally to methods and apparatuses, including computer program products, for providing an appropriate and consistent user experience consistency across channels based on user and context.

BACKGROUND

As technology has advanced, users are presented with an ever-increasing variety of channels or platforms through which to interact with brands and service providers. Legacy channels including live telephone conversations with service agents and representatives coexist with electronic communications such as text-based online chat sessions (e.g., via web browser or mobile app) and/or voice-based chat sessions (e.g., via smart assistant devices and platforms such as Amazon® Alexa™) that involve the use of computing devices and related software. Users expect providers to have a presence across all of these platforms allowing them to interact using their choice or one or more channels at a time.

For example, automated conversation service software applications such as virtual assistants (VAs) and chatbots may be used to interact with end users intelligently using advanced language processing and data interpretation techniques. A user may begin an interaction using such a service via telephone but may migrate to or simultaneously interact with the provider via a web or mobile text interface.

Furthermore, customers are coming to expect personalization in their experiences with brands so that their interactions are tailored to their needs, making them feel recognized and saving user time. Companies are now faced with the problem of maintaining a cohesive, personalized experience across myriad channels. Doing so using present technology is difficult as many channel-specific engagement solutions integrate independently without sharing data, context, or rules. This results in tight coupling and a high degree of cohesion with tools, making it difficult for businesses to innovate and adapt swiftly in personalized experience management. This has resulted in channel experiences that have a high integration cost and no standardization.

Current technology addresses this issue as a data synchronization problem across different channels using capabilities like Customer Data Platforms (CDP). CDPs allow marketers to collect and unify data from various sources and define audiences via self service capabilities. They then activate these audiences in different channels via CDP.

Unfortunately, such technologies result in different channel sharing audiences but suffer from a last mile challenge to the activation points. That is, each of the channels require their own rules that are channel-specific which leads to significant duplication of activation rules at the channels. Furthermore, there is no context sharing between channels which results in different experiences being rendered in different channels. There is also no consistency in the rules execution order in the channels and data in the channels can become outdated by execution time. Journey orchestration capabilities suffer from the same last-mile consistency problem as CDPs because they are disconnected from the activation point.

Another issue with current methods is that different parts of a company (such as service, marketing, regulatory, etc.) can end up competing to get their messages to the users within the same experiences. Users might see different messages at different times on the same experience.

SUMMARY

Instead of the industry followed federated model of mapping customer to experience at the channels, systems and methods of the invention address the above issues by offering a centralized arbitrator of experience treatment selection which can be called by channels via a simple API interface. Accordingly, the tools described herein can allow for the development of context-aware, consistent cross-channel customer experiences. Customers can then receive a consistent, personalized and dynamic experience across channels, increasing their engagement and engendering brand satisfaction and loyalty.

Aspects of the invention can include a computerized method for cross-channel treatment application. Methods can include steps of: establishing a first communication session with a user in a first channel; receiving, at a treatment selector application, a user identifier and an experience context from the first channel; retrieving, from a treatment map store, one or more treatment maps compatible with the experience context, wherein the one or more treatment maps comprise an eligibility rule; obtaining customer attributes for the user from an attribute store using the user identifier; providing the one or more treatment maps and the customer attributes to an eligibility rule engine and determining, using the eligibility rule engine, a set of eligible treatment maps based on the customer attributes and the eligibility rules for each of the one or more treatment maps; returning, to the first channel, identifiers for one or more of the set of eligible treatment maps; and retrieving and applying at the first channel, using the identifiers, a treatment map selected from the set of eligible treatment maps using a treatment catalog. Methods may include updating the attribute store with context data and user information received in the process and/or information relating to the recommended treatment provided to the channel. Treatment selector selections can then be tracked and iteratively impact future interactions by that user on various other channels.

In various embodiments, method can include establishing one or more additional communication sessions with the user in one or more additional channels different than the first channel; repeating the receiving, retrieving, obtaining, providing, and returning steps for each of the one or more additional channels; and retrieving and applying at the one or more additional channels, using the identifiers, a channel-specific treatment map selected from the set of eligible treatment maps using the treatment catalog. The first channel can be selected from the group consisting of web, mobile, chat, call routing, and customer relationship manager (CRM).

The treatment map may be selected from the group consisting of content, email templates, message templates, model endpoints, external treatment provider endpoints, experiments, and treatment recommender systems. The treatment selector can comprise an application programming interface (API). The treatment selector application may include the API, the treatment map store, the attribute store, the eligibility rule engine, and the treatment catalog. The treatment selector application may be in communication with one or more treatment providers storing channel-specific treatments wherein treatment content of each treatment provider is cataloged by its identifier in the treatment catalog.

In certain embodiments, the retrieving and applying step can further comprise retrieving the first-channel-specific treatment map from the one or more treatment providers. The one or more treatment providers may be selected from the group consisting of a content management system, a template repository, a recommender system, and an experimentation system. The template repository can include e-mail templates, chat templates, call scripts, or web layouts.

Aspects of the invention can include a computer system for consistent cross-channel treatment application, the system comprising a computing device having a memory that stores computer-executable instructions and a processor that executes the computer-executable instructions. The system can be operable to: establish a first communication session with a user in a first channel; receive, at a treatment selector application, a user identifier and an experience context from the first channel; retrieve, from a treatment map store, one or more treatment maps compatible with the experience context, wherein each of the one or more treatment maps comprises an eligibility rule; obtain customer attributes for the user from an attribute store using the user identifier; provide the one or more treatment maps and the customer attributes to an eligibility rule engine and determine, using the eligibility rule engine, a set of eligible treatment maps based on the customer attributes and the eligibility rules for each of the one or more treatment maps; return, to the first channel, identifiers for one or more of the set of eligible treatment maps; and retrieve and apply at the first channel, using the identifiers, a treatment map selected from the set of eligible treatment maps using a treatment catalog. Computer systems of the invention can be operable to perform any of the methods described herein.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIG. 8 shows an exemplary display of experience context information across various channels.

FIG. 9 shows exemplary treatment catalog entry data.

DETAILED DESCRIPTION

Figure 1:
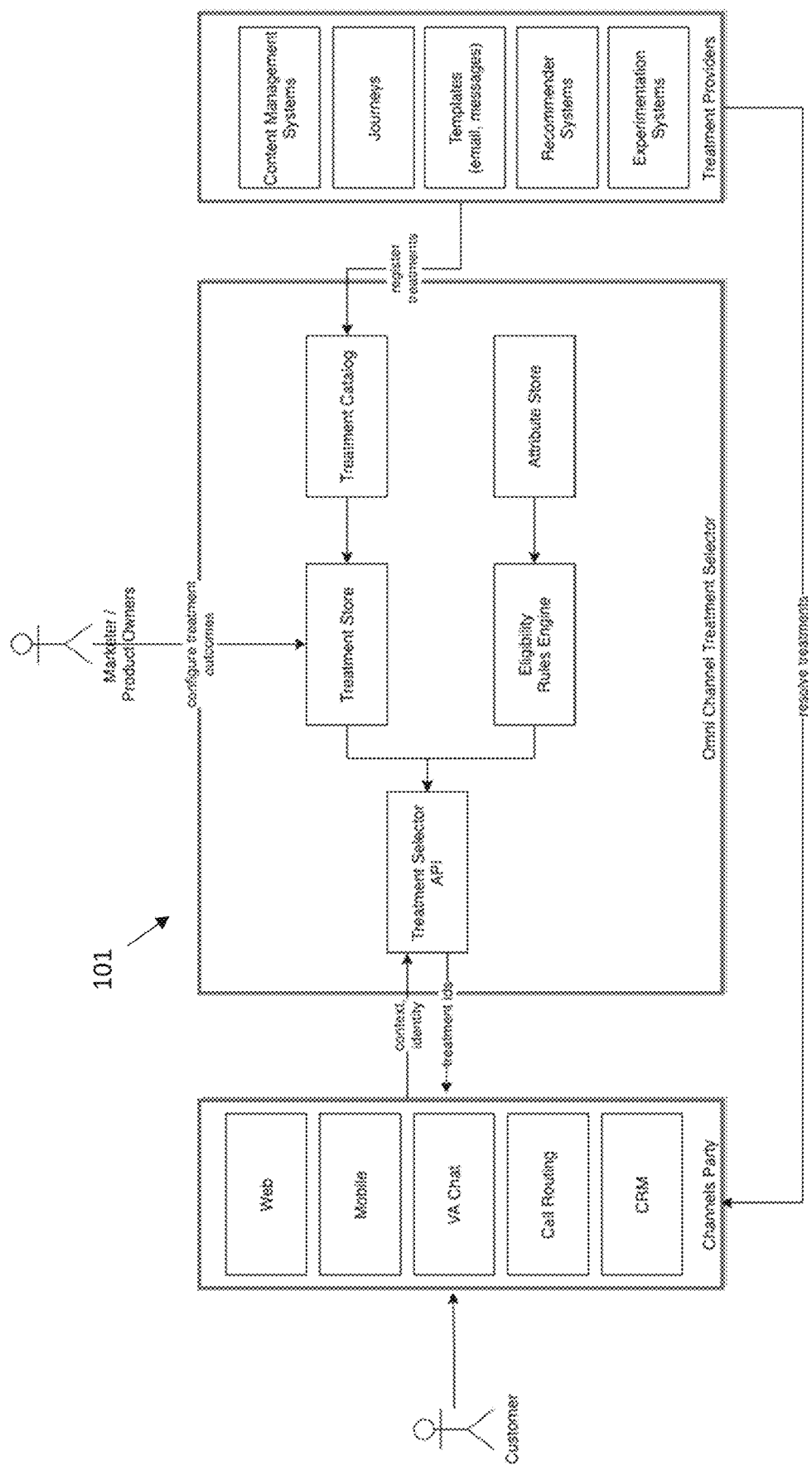
FIG. 1 is an exemplary logic architecture for providing a personalized user experience across channels.

FIG. 1 is a block diagram of system 100 for providing a user experience across a variety of channels. The system 100 can use application programming interfaces (APIs) that are called by computing devices associated with various channels upon user interaction. Exemplary channels through which a user may interact with the brand or company can include using a computer, telephone, or mobile device to access a company website, mobile app, virtual assistant (VA) chat, call routing via a telephone menu, or customer relationship management (CRM) software. Programs in any of these channels may, upon being accessed by a user, ascertain the user's identification and provide that information along with any contextual information (an experience context) regarding the interaction to the exemplary system 100. As shown in FIG. 1, an exemplary system 100 may include five discrete components to drive a personalized, consistent user experience across the channels. These components can include a treatment catalog, an attribute store, an eligibility rule engine, a treatment map store, and a treatment selector API.

The treatment catalog can be a datastore of different treatment options in the context of a channel and placement. For example, the datastore may list several different website landing page layouts by content identifier. Different types of treatments will depend on the channel (e.g., visual media on a mobile device vs. audio via a telephone system) and can include content, email templates, message templates, journeys, model endpoints, external treatment provider endpoints, experiments, and treatment recommender systems. The treatment catalog can register treatments from a variety of treatment providers such as content management systems, journeys, e-mail or messaging templates, recommender systems, or experimentation systems. The treatment providers can be internal or third-party providers. The treatment catalog can provide a simple API or user interface by which treatment providers can easily register their treatments into the catalog. By centralizing the treatment selector apart from individual channels while decentralizing actual treatments, a company can rapidly and easily integrate new application rules and user information across channels as well as easily maintaining a large variety of up-to-date templates. An exemplary structure for treatment cataloging follows:

```
{
  "treatmentType":
"CONTENT|EMAIL|JOURNEY|EXPERIMENT|RECOMMENDATION",
    "treatmentSource": "someTreatmentProvider",
    "treatmentId": "sourceSystemIdentifier:123456",
    "treatmentDescription": "some brief description",
    "treatmentMetadata": {
       "content": {
         //relevant content metadata
         //...
       },
       "email": {
         //relevant email metadata
         //...
       },
       "journey" : {
         //relevant journey metadata
         //...
       },
       "experiment": {
```

```
        //relevant experiment metadata
        //...
    },
    "recommendation": {
        //relevant recommendation metadata
        //...
    }
  }
}
```

An exemplary treatment catalog entry is shown in FIG. 10. Treatment data can include, for example, an identifier, data on impressions and clickthrough rate (e.g., effectiveness), information on potential applications (e.g., mobile, web, or e-mail template), a location or path for the treatment, and/or a title or headline for the treatment.

The attribute store can be a low latency datastore that is indexed by customer identifier and contains various attribute data about a customer based, for example, on user input and/or prior interactions. The attribute store is preferably refreshed with a low latency to provide the most recent version of the attributes. This store can be used by the eligibility rule engine to qualify a customer for a given experience.

The eligibility rule engine can be a rule engine that validates the eligibility (or ineligibility) of a treatment in the context of an experience and customer using the customer attribute store.

The treatment map store can be a data store containing maps of experience contexts mapped to an eligibility rule and treatment outcome identifier (referenced from the treatment catalog). The marketer and product owners requiring personalization can configure these treatment maps. The treatment selector (e.g., via API) can act as the central arbitrator that interacts with each of the above components and abstracts the treatment selection logic from the channel activation point.

In an exemplary scenario, the channel experience (e.g., customer access of the company website via a computer) will be configured to call the Treatment Selector API. That call can consist of passing on an experience context and customer identifier. The treatment selector can then call the treatment map store to retrieve the treatment maps configured for the context. Then the eligibility rule associated with the treatment map are passed to the eligibility rule engine. The eligibility rule engine will then parse the rule, identify customer attributes in the rule. The customer attributes can then be retrieved from the customer attribute store and then the rules can be executed with customer attributes as input. The rules engine returns the outcome of the rules back to the treatment selector, which can then map the rule output to the treatment maps and identify the treatments eligible for the given context and return a list of eligible treatment identifiers back to the channel. The channel can then call the treatment catalog with the list of eligible treatment identifiers to retrieve the appropriate channel specific content and then provide it back to the channel to be rendered. By following this model, channels do not need to house any channel-specific activation logic and completely delegate the responsibility to personalizing the experience to the treatment selector.

Also, since the rules are centralized and external to each individual channel, the same rule can now be shared by different channel or different contexts in the same channel. This results in cross channel consistency without the need to update individual channels.

Applications or programs operable to execute the methods described herein can be stored or located on any computing device including networked computing devices (e.g., service endpoints, remote servers and the like). Various channels can access and communicate with a treatment selector application and, in turn, the treatment selector application may communicate with databases and other programs via one or more communications networks to provide input and receive output relating to the methods described herein. Exemplary computing devices include but are not limited to server computing devices, desktop computers, laptop computers, tablets, mobile devices, smartphones, smart assistant devices (e.g., smart speakers), and the like. It should be appreciated that other types of computing devices that are capable of connecting to the components of system can be used without departing from the scope of the technology described herein.

Figure 2:
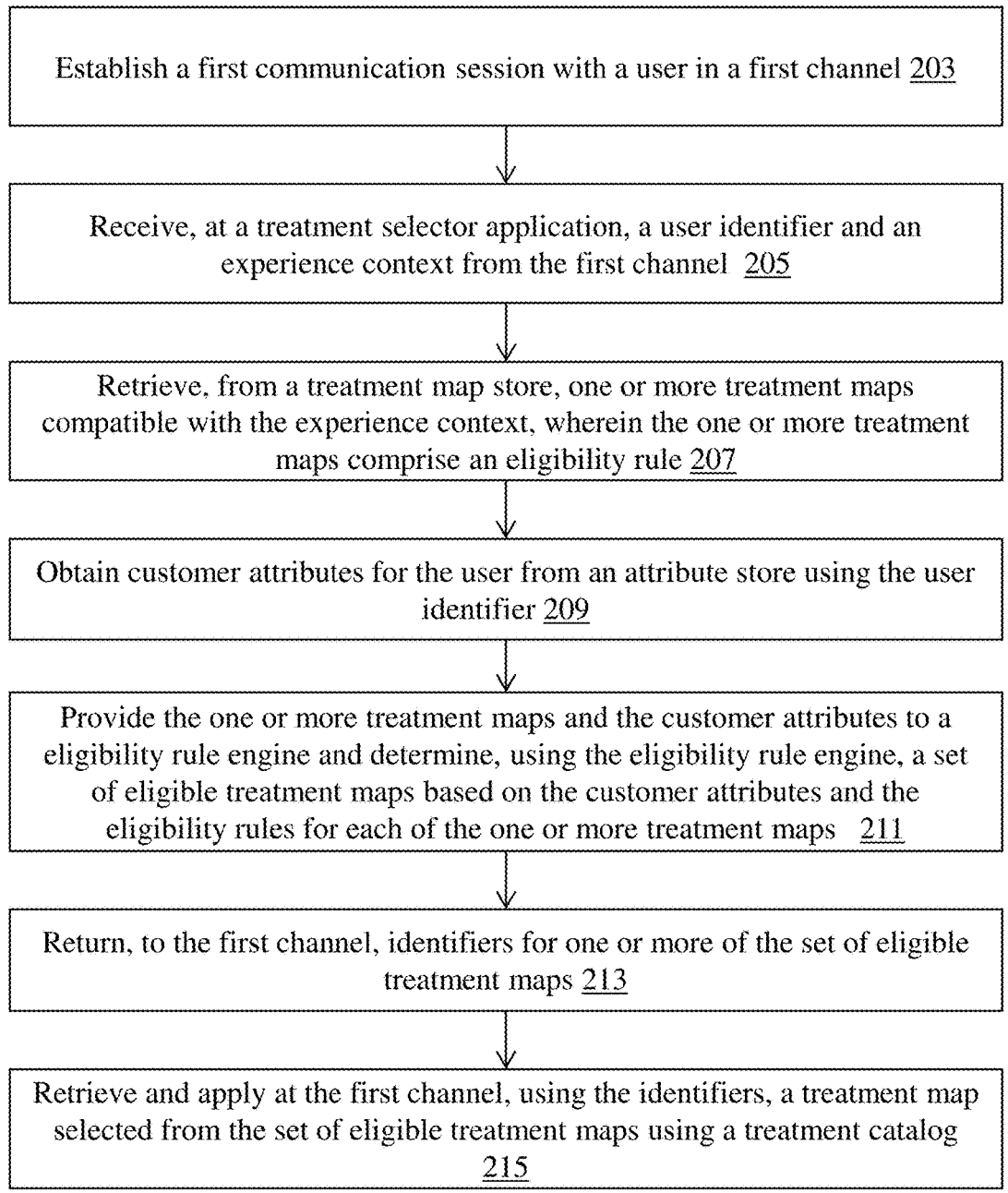
FIG. 2 is a flow diagram of a computerized method for providing a personalized user experience across channels.

FIG. 2 is a flow diagram of a computerized method 201 for providing a personalized user experience across channels, using system 101 of FIG. 1. An end user interacting with a brand or company through a first channel (e.g., a website) via a computer or mobile device, can interact with one or more software applications on the device establish 203 a first communication session in that first channel. For example, a user may access a financial services website to inquire about the status of a stock trade request. A treatment selector application can then receive 205 a user identifier and an experience context from the first channel. The treatment center application can be located on a remote server and may receive the aforementioned information via a network. The user information and/or experience context can be obtained by the first channel by a variety of methods including a user login and/or cookies that carry identifying information based on prior user activity using the browser by which the user accesses the first channel. Experience context information may also be derived from login or cookies. An exemplary display tracking experience context information across different channels is shown in FIG. 9.

Based on the experience context information, the system can retrieve 207 one or more treatment maps compatible with the experience context information. These treatment maps may include, for example, various website layouts that are relevant to end customers of the financial services website having similar characteristics to the user. The treatment maps may each include a set of eligibility rules indicating characteristics of users for which the treatment map may be applicable.

The system, using the user identifier received from the first channel, can obtain 209 user-specific customer attributes from a database such as an attribute store. This attribute store can be updated, with low latency, with any and all information obtained regarding the user and their prior interactions with the company or brand through any channel. For example, in the above hypothetical, the attribute store will have noted that the user associated with the provided identifier has recently attempted a stock trade request and, perhaps, that the trade request has failed for some reason.

The one or more treatment maps, along with their associated eligibility rules, can be provided 211, along with the retrieved customer attributes, to an eligibility rule engine for analysis. For example, the customer attributes indicating a recent failed trade request may be incompatible with the rules for several treatment maps but may meet the rules for a website landing page treatment map that provides an apology and facilitates resolution of the failed trade attempt.

Identifiers for any eligible treatment maps identified by the eligibility rule engine can then be returned 213 to the first channel. For example, the website landing page treatment map can be identified to the first channel.

The first channel can then retrieve 215 the identified treatment map from a treatment catalog in communication with the system and apply that treatment map, giving the appearance of a personalized web presence quickly anticipating the user's needs.

Figure 7:
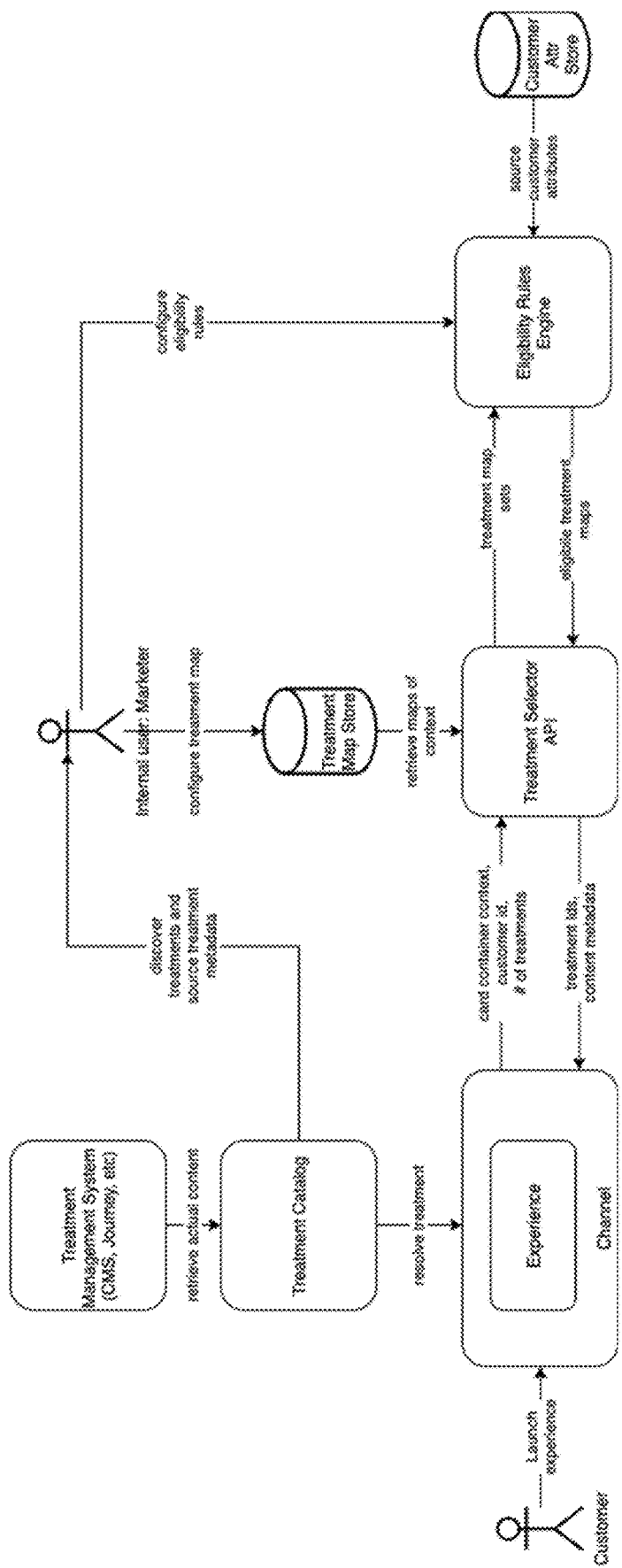
FIG. 7 shows an exemplary flow diagram for use of a centralized, cross-channel treatment selector.

FIG. 7 provides another depiction of how a treatment selector can be implemented. The customer initiates an experience in a first channel (e.g., opening a mobile application from the company). The channel provides customer data (e.g., context information, customer identifier, and the number of treatments required) to the treatment selector (e.g., a treatment selector API). The treatment selector API is in communication with a treatment map store from which it retrieves potential treatment maps based on context as well as an eligibility rules engine to which it provides the retrieved maps and some customer information (e.g., an identifier). The eligibility rules engine can query a customer attribute store based on the customer information to obtain customer attributes to compare against the rules/requirements associated with each of the potential treatment maps provided by the treatment selector. Based on these rule applications, the eligibility rules engine can return a subset of eligible treatment maps that have been screened based on both the context and the user. Both the treatment map store and the eligibility rules engine can be manipulated and updated by an internal user based on company preferences. The treatment selector can then return identifiers of the subset of eligible treatment maps to the channel that can independently retrieve and apply the treatments from a treatment management system through a treatment catalog.

Figure 3:
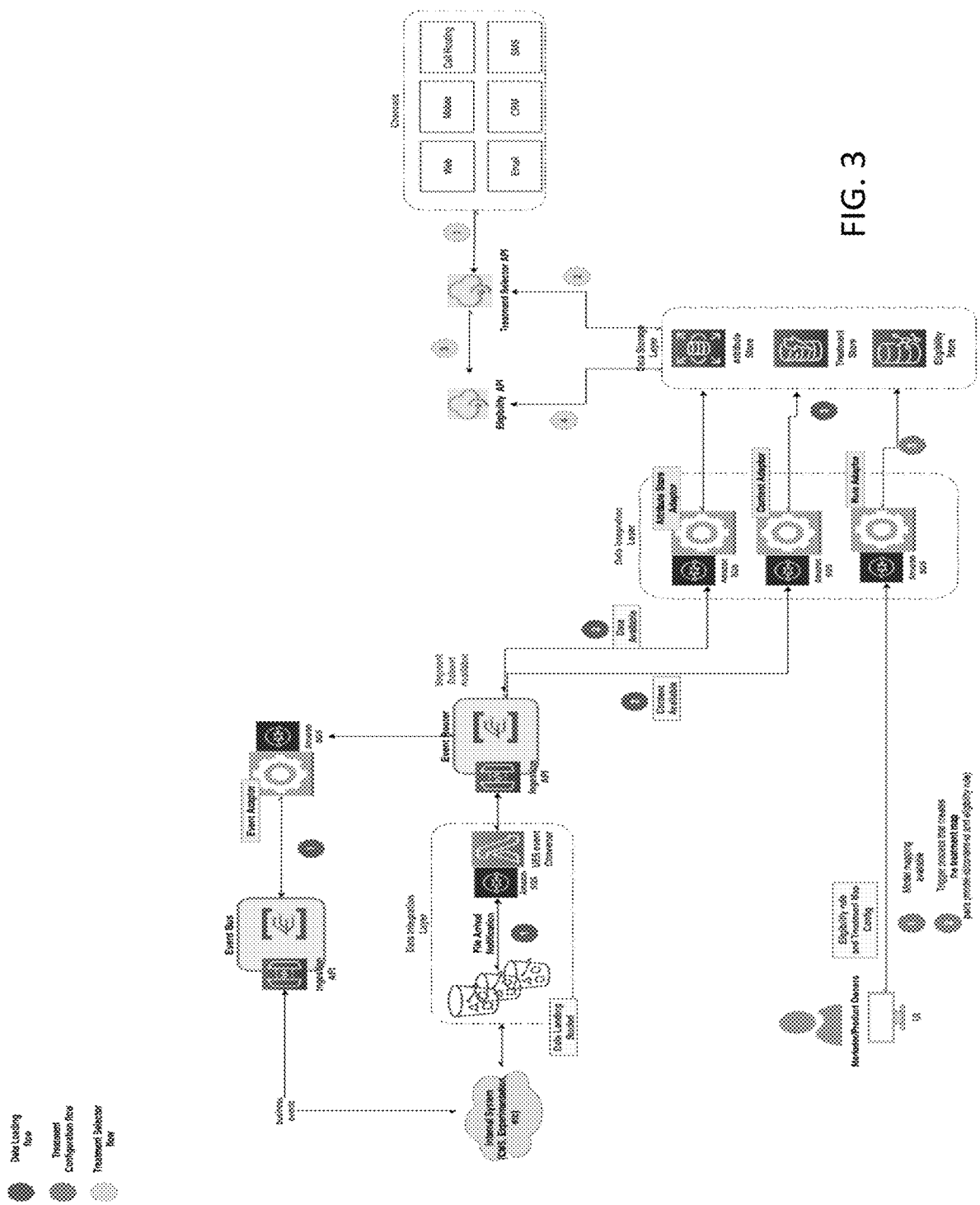
FIG. 3 is an exemplary physical system architecture for providing a personalized user experience across channels.

FIG. 3 shows an exemplary physical architecture for carrying out centralized cross-channel treatment selection. Company administrators (e.g., marketing professionals) can provide or alter eligibility rules and configure treatment maps through a user interface. These can be adapted in a data integration layer and stored in a data storage layer. Various available treatments can be added and cataloged by the system through a combination of ingestion APIs, event buses, event adapters, internal systems, data integration layers, and event routers. The data integration layer (including an attribute store adapter, content adapter, and rule adapter) coordinate treatment flowing from the various sources via the event router as well as model mapping and treatment eligibility configuration data flowing from company administrators. Channels seeking coordinated treatments (e.g., web, mobile, call routing, email, CRM, or SMS) can call the treatment selector API which can coordinate with an eligibility API, draw data from the data storage layer, and return an ID for a desired treatment map to the channel which can then directly pull and apply the treatment map.

Figure 4:
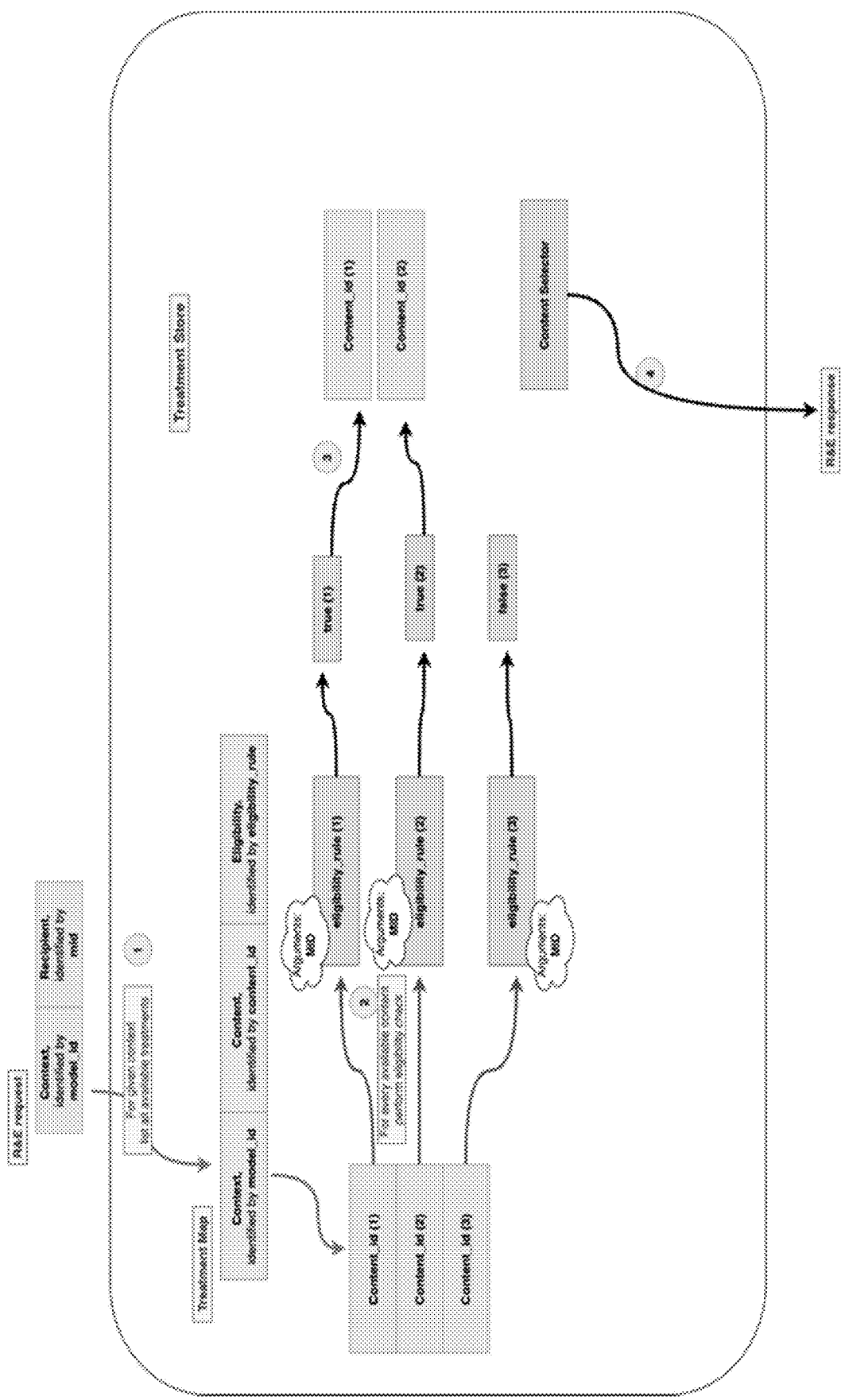
FIG. 4 depicts a first exemplary algorithm for channel treatment selection.
Figure 5:
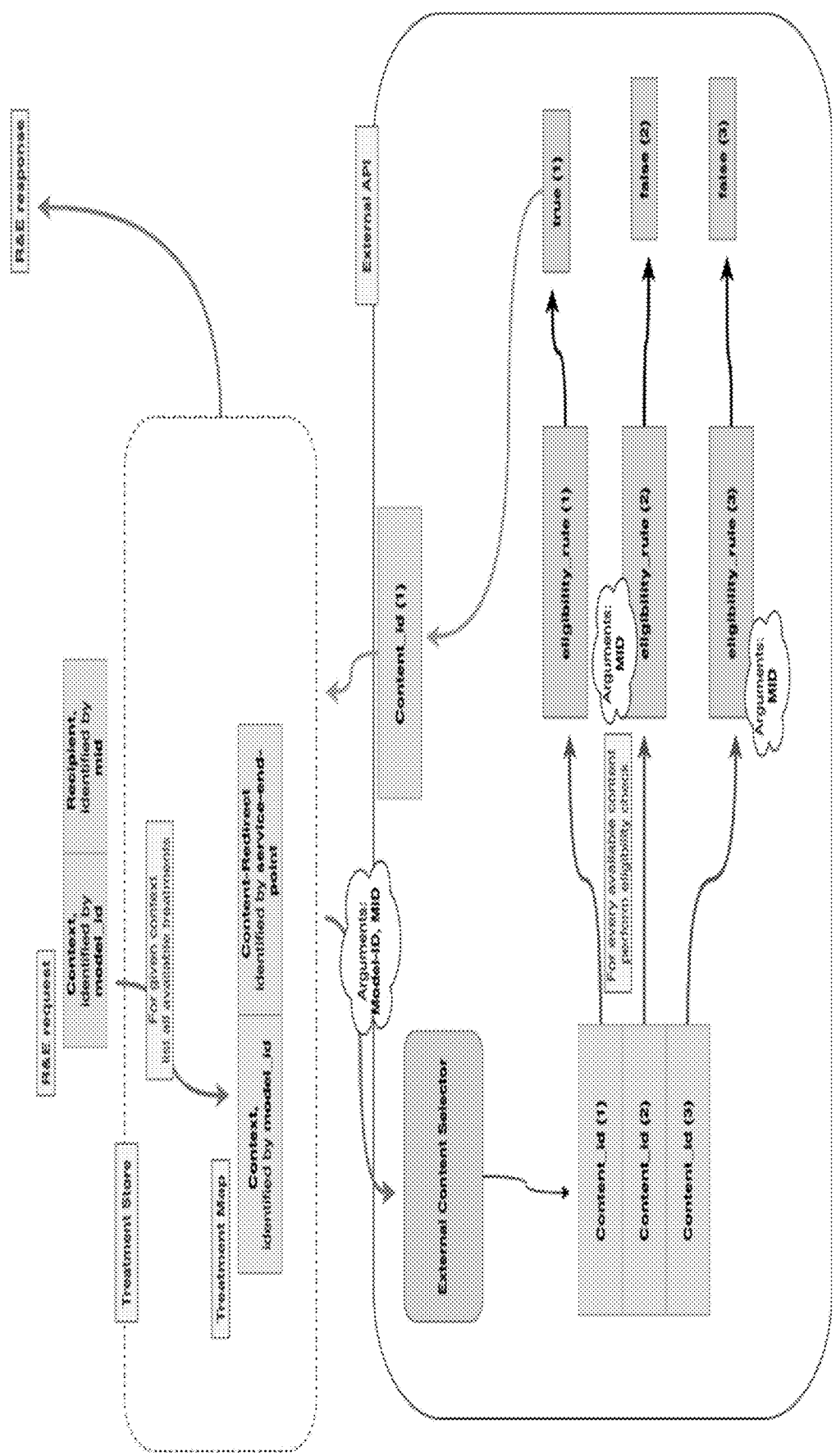
FIG. 5 depicts a second exemplary algorithm for channel treatment selection.
Figure 6:
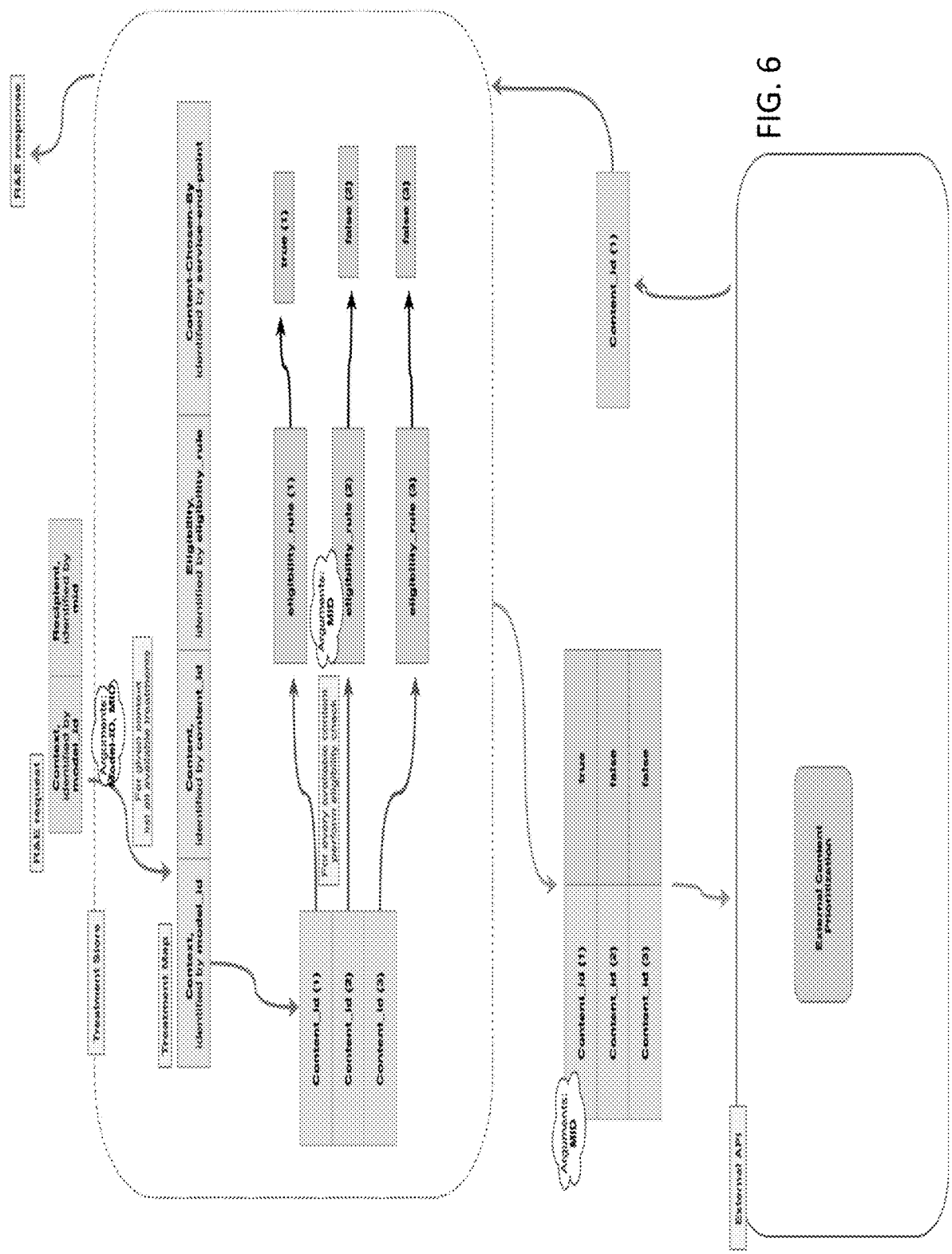
FIG. 6 depicts a third exemplary algorithm for channel treatment selection.

FIGS. 4-6 show three exemplary algorithms that might underly various treatment selectors. FIG. 4 illustrates an exemplary algorithm for a rule-based treatment selector which allows users to map experience context eligibility rules to treatment outcome. FIG. 5 shows an exemplary algorithm for a delegation-based treatment selection that may incorporate an external treatment provider like recommender systems or experimentation systems. In the illustrated case, the eligibility and treatment outcome are managed by the external treatment providers. Such a model advantageously allows companies add newer treatment providers seamlessly without requiring experiences to manage integration of these treatment providers.

FIG. 6 shows an exemplary hybrid model that combines the treatment selection flow shown in FIG. 4 and the delegation-based pattern of FIG. 5. In such cases, once the eligible treatments are identified, the treatments are then sent to an external prioritization engine which ranks the treatments based on the current customer state. Such an algorithm can be useful when integrating with artificial intelligence or machine learning based recommender systems that prioritize the recommendations for a given set of treatments and customer data.

User and context data can comprise one data object or a plurality of data objects. Multiple contexts can be sent in the same request as an array of context objects. An exemplary request structure providing context objects is provided below:

Sample Request Structure:

```
{
  "contexts": [
    {
      "context": "the experience location ",
      "personaIdType": "some customer identifier type",
      "personaId": "ID1234",
      "limit": "number of treatments requested for the context, default will be -1",
      //default is persist_order when no selectionLogic is passed, also the API will honor the treatment order sent back from external treatment providers
      "selectionLogic": "persist_order|random",
      // optional
      "requestContext": {
        //optional field that is needed only for Reco API
        "category":["Actions", "Article", "Podcasts"],
        // optional, set only for web requests
        "browser": {
          "page": "https://some.url.com/"
        },
        //populated by calling client, if it needs to pass in additional metadata to the backend treatment provider
        "metadata": [
          {
            "name": "key",
            "value": "value"
          }
        ]
      }
    }
  ]
}
```

An exemplary response from the treatment selector is provided below returning relevant information to identify a treatment for the channel to apply and providing information on where and how to obtain and apply the treatment.
Sample Response Structure:

```
{
  //list of contexts to be returned to be consistent with request model
  "contexts": [
    {
      "context": "Some experience context",
      "limit": "1",
      "selectionLogic": "persist_order|random",
      "treatments": [
        {
          "treatmentId": "bf220ab3-07b8-4733-87e4-4596f410d352",
          //optional to be populated within the context of offers response
          //default is content_id, reco specific behavior: if treatmentIdType=conent_id then apply filtering
          "treatmentIdType": "content_id|email|journey|experiment|recommendation",
          "treatmentSource": "someTreatmentSource",
          //this float value is set only for Model
          "treatmentScore" xx.xx,
          // anything below here will be considered "metadata" to the CMR SDK
          //this is populated only in the case of experiments
          "experiment": {
            "experimentId": "EXP123",
            "audienceId": "audienceId"
          },
          //this is populated only in the case of campaigns
          "campaign": {
            "campaignId": "CAMP1234",
            "cellId": "101",
            "audienceId": "flow_id:1234~variantA"
          }
        }
      ],
      //added this to be consistent with request context
      "responseContext": {
        "someTreatmentProviderResponse": {
          "status": 200,
          "requestId": "5d05ff36-0955-4fcf-973f-5fe260f61e71",
          "id": {
            "tntId": "c5fd7030-997f-496b-b762-09a4784ab695.35_0",
            "thirdPartyId": "ee52c55f54fef711d7b3f5ac196951aa77",
            "customerIds": [ ]
          }
        }
      }
    }
  ]
}
```

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for consistent cross-channel treatment application, the method comprising:
   establishing a first communication session with a user in a first channel;
   receiving, at a treatment selector application, a user identifier and an experience context from the first channel;
   retrieving, from a treatment map store, one or more treatment maps compatible with the experience context, wherein each of the one or more treatment maps comprises an eligibility rule;
   obtaining customer attributes for the user from an attribute store using the user identifier;
   providing the one or more treatment maps and the customer attributes to an eligibility rule engine and determining, using the eligibility rule engine, a set of eligible treatment maps based on the customer attributes and the eligibility rules for each of the one or more treatment maps;
   returning, to the first channel, identifiers for one or more of the set of eligible treatment maps; and
   retrieving and applying at the first channel, using the identifiers, a first-channel-specific treatment map selected from the set of eligible treatment maps using a treatment catalog.

2. The computerized method of claim 1, further comprising:
   establishing one or more additional communication sessions with the user in one or more additional channels different than the first channel;
   repeating the receiving, retrieving, obtaining, providing, and returning steps for each of the one or more additional channels; and
   retrieving and applying at the one or more additional channels, using the identifiers, a channel-specific treatment map selected from the set of eligible treatment maps using the treatment catalog.

3. The computerized method of claim 1, wherein the first channel is selected from the group consisting of web, mobile, chat, call routing, and customer relationship manager (CRM).

4. The computerized method of claim 1, wherein the treatment map is selected from the group consisting of content, email templates, message templates, model endpoints, external treatment provider endpoints, experiments, and treatment recommender systems.

5. The computerized method of claim 1, wherein the treatment selector comprises an application programming interface (API).

6. The computerized method of claim 5, wherein the treatment selector application comprises the API, the treatment map store, the attribute store, the eligibility rule engine, and the treatment catalog.

7. The computerized method of claim 1, wherein the treatment selector application is in communication with one or more treatment providers storing channel-specific treatments wherein treatment content of each treatment provider is cataloged by its identifier in the treatment catalog.

8. The computerized method of claim 7, wherein the retrieving and applying step further comprises retrieving the first-channel-specific treatment map from the one or more treatment providers.

9. The computerized method of claim 7, wherein the one or more treatment providers are selected from the group consisting of a content management system, a template repository, a recommender system, and an experimentation system.

10. The computerized method of claim 9, wherein the template repository comprises e-mail templates, chat templates, call scripts, or web layouts.

11. A computer system for consistent cross-channel treatment application, the system comprising a computing device having a memory that stores computer-executable instructions and a processor that executes the computer-executable instructions to:
   establish a first communication session with a user in a first channel;
   receive, at a treatment selector application, a user identifier and an experience context from the first channel;
   retrieve, from a treatment map store, one or more treatment maps compatible with the experience context, wherein each of the one or more treatment maps comprises an eligibility rule;
   obtain customer attributes for the user from an attribute store using the user identifier;
   provide the one or more treatment maps and the customer attributes to an eligibility rule engine and determine, using the eligibility rule engine, a set of eligible treatment maps based on the customer attributes and the eligibility rules for each of the one or more treatment maps;
   return, to the first channel, identifiers for one or more of the set of eligible treatment maps; and
   retrieve and apply at the first channel, using the identifiers, a treatment map selected from the set of eligible treatment maps using a treatment catalog.

12. The computer system of claim 11, wherein the computing device is further operable to:
   establish one or more additional communication sessions with the user in one or more additional channels different than the first channel;
   repeat the receiving, retrieving, obtaining, providing, and returning steps for each of the one or more additional channels; and
   retrieve and apply at the one or more additional channels, using the identifiers, a channel-specific treatment map selected from the set of eligible treatment maps using the treatment catalog.

13. The computerized method of claim 11, wherein the first channel is selected from the group consisting of web, mobile, chat, call routing, and customer relationship manager (CRM).

14. The computer system of claim 11, wherein the treatment map is selected from the group consisting of content, email templates, message templates, model endpoints, external treatment provider endpoints, experiments, and treatment recommender systems.

15. The computer system of claim 11, wherein the treatment selector comprises an application programming interface (API).

16. The computer system of claim 15, wherein the treatment selector application comprises the API, the treatment map store, the attribute store, the eligibility rule engine, and the treatment catalog.

17. The computer system of claim 11, wherein the treatment selector application is in communication with one or more treatment providers storing channel-specific treatments wherein treatment content of each treatment provider is cataloged by its identifier in the treatment catalog.

18. The computer system of claim 17, further operable to retrieve the first-channel-specific treatment map from the one or more treatment providers.

19. The computer system of claim 17, wherein the one or more treatment providers are selected from the group consisting of a content management system, a template repository, a recommender system, and an experimentation system.

20. The computer system of claim 19, wherein the template repository comprises e-mail templates, chat templates, call scripts, or web layouts.

* * * * *